United States Patent [19]
Barmatz et al.

[11] Patent Number: 6,054,693
[45] Date of Patent: Apr. 25, 2000

[54] MICROWAVE TECHNIQUE FOR BRAZING MATERIALS

[75] Inventors: Martin Barmatz, La Crescenta; Henry W. Jackson, La Verne, both of Calif.; Robert P. Radtke, Kingwood, Tex.

[73] Assignee: California Institute of Technology, Pasadena, Calif.

[21] Appl. No.: 09/008,214

[22] Filed: Jan. 16, 1998

Related U.S. Application Data

[60] Provisional application No. 60/035,702, Jan. 17, 1997.

[51] Int. Cl.⁷ .............................. H05B 6/64; H05B 6/68
[52] U.S. Cl. ...................... 219/678; 219/679; 219/702; 219/710; 219/704; 228/103; 228/262.31; 228/262.9
[58] Field of Search ................... 219/678, 679, 219/710, 711, 702, 704; 228/102, 103, 104, 122.1, 262.1, 262.3, 262.31, 262.71, 262.72, 262.8, 262.9

[56] References Cited

U.S. PATENT DOCUMENTS

| | | |
|---|---|---|
| 3,766,634 | 10/1973 | Babcock et al. ............... 29/471.9 |
| 4,772,770 | 9/1988 | Matsui et al. .................. 219/10.55 |
| 4,777,090 | 10/1988 | Ovshinsky et al. ............. 428/408 |
| 4,940,015 | 7/1990 | Kobashi et al. ................ 118/729 |
| 5,240,749 | 8/1993 | Chow .............................. 427/575 |
| 5,284,394 | 2/1994 | Lemelson ........................ 384/463 |
| 5,370,912 | 12/1994 | Bigelow et al. ............... 427/575 |
| 5,471,970 | 12/1995 | Sakaarcan ...................... 125/15 |
| 5,527,747 | 6/1996 | Lackey, Jr. et al. .......... 501/90 |

Primary Examiner—Philip H. Leung
Attorney, Agent, or Firm—Fish & Richardson P.C.

[57] ABSTRACT

A method enabling controlled selective heating of workpiece components during microwave brazing. Two workpiece components are joined by melting an adhesion interlayer material between the two components. An indication of when the interlayer has melted is provided. The temperature difference across the braze assembly is monitored and adjusted via a feedback loop to reduce stresses in the braze joint resulting in a stronger braze joint.

37 Claims, 4 Drawing Sheets

MICROWAVE TECHNIQUE FOR BRAZING MATERIALS

This application claims benefit under 35 U.S.C. 119(e) of the U.S. Provisional Application Ser. No. 60/035,702, filed on Jan. 17, 1997, the entirety of which is incorporated herewith by reference.

ORIGIN OF THE INVENTION

The invention described herein was made in the performance of work under a NASA contract, and is subject to the provisions of Public Law 96-517 (35 USC 202) in which the Contractor has elected to retain title.

FIELD OF THE INVENTION

The present invention generally relates to the use of microwave heating to join similar and dissimilar materials. In particular, the preferred embodiment describes the brazing of components in the fabrication of abrasion resistant cutter assemblies.

BACKGROUND

Petroleum, mining, geothermal, and other cutting bits have a fixed cutter attachment called a cutter assembly. The cutter assembly is attached to a rotatable drill bit head. The drill bit head is attached to a threaded pin used to attach the drill bit to a drill string assembly. The drill string assembly is rotated and weight is applied to the drill bit. The cutter assembly drags on the bottom of the hole and shears the rock producing rock cuttings. The cuttings are removed from the face of the drill bit by drilling fluids directed across the face of the drill bit, usually with one or more nozzles.

The cutter assembly needs to be extremely wear resistant. One technique is to form the assembly from synthetic very hard material, such as diamond, joined to a rigid tungsten carbide support. The diamond component can be attached to the tungsten carbide component by brazing. A braze filler interlayer is positioned between the diamond component and the tungsten carbide component. The interlayer is melted and upon subsequent solidification is bonded to the diamond component and to the tungsten carbide component forming a braze joint.

Bulk area heating, such as furnace heating, has been used to join cutter assembly components. All components are heated slowly to around 800° C. and melted to form a material that has a liquid, or a mixture of liquid and solid parts. When melted, the braze interlayer wets the substrates to be joined and adheres to both the diamond component and the tungsten carbide component. This heating technique is non-selective, meaning that the entire element is heated uniformly. Average shear strength levels of 138 Mpa to 207 Mpa (20,000 to 35,000 psi) are possible by using non-selective heating methods.

However, during high temperature drilling conditions, the performance of drill bits produced by non-selective heating is limited. Dramatic reduction of the shear strength in the braze joint between the diamond cutting component and the support substrate occurs at high temperatures. As a result, drill bits are likely to fail at temperatures exceeding 700° C. Thus, a method that produces a diamond cutter with a stronger braze joint leading to an improved shear strength at higher temperatures is desired.

SUMMARY

The inventors have found improvements from control of the heating process and the use of specific heating. Specific heating is applied to specific locations rather than the whole element. More specifically, selective heating is applied in a way to form a temperature difference across the joint. The present invention enables a controlled selective heating process. Controlled selective heating allows adjustments to be made during the brazing process.

Components to be joined by brazing are selectively heated by microwave energy. Each component absorbs microwave energy at a rate that depends on its complex dielectric constant, shape, position and orientation in the furnace. Temperature differences between the components are monitored and adjusted to reduce microscopic fractures that can result from any difference in thermal expansion among various materials during rapid heating and cooling. The actual temperature difference will depend on the separation distances between components, the thermal conductivity of the components, and the heating or cooling rate. Adjustment of the separation distance and heating/cooling rates allow better control of the brazing process. Controlled temperature differences in the components adjacent to the interlayer can reduce stresses in the braze joint and improve braze joint strength.

An indicator of when the interlayer has melted is helpful in controlling the heating process. The temperature of the braze interlayer material will depend on the energy absorbed. The interlayer temperature also is affected by the conduction and radiation occurring between the diamond and support components as they are being heated. After the interlayer has melted, the temperature can be adjusted to allow a gradual temperature decrease. Temperature adjustment after the interlayer has melted can also be done by modifying the microwave power level. After the brazing temperature is reached, the time-temperature heating curve is adjusted to enhance the brazing process and to slowly lower the processing temperature so as to reduce stresses induced in the brazed components.

The present invention uses microwave energy to selectively heat and braze components in a way that produces a clear indication of when the interlayer has melted. The present method allows both joining of similar material components and joining of dissimilar material components. Joining dissimilar components can include joining any combination of the following: ceramic materials, semiconductor materials, or metallic materials. In one embodiment, a brazing interlayer is positioned between a diamond component and a tungsten carbide component forming a three component assembly. The diamond component and the tungsten carbide component are brazed to form a cutter assembly. The interlayer material will usually have high points along its surface that will initially reduce the thermal conduction to and from the other components. This effect can be emphasized by using an interlayer with peaks and valleys on its surface. This can reduce the thermal heat transfer between the interlayer and diamond/substrate materials.

Another embodiment uses functionally-graded materials as the interlayer to improve braze joints. Functionally-graded materials have different compositions along one dimension. For example, brazing a ceramic material to a metallic material can have a functionally-graded interlayer with properties that have more affinity for a ceramic material on one end and properties that have more affinity for a metallic material at the end in contact with the metal material.

The interlayer can also be made from combustion synthesis materials. The interlayer can then be ignited by microwaves. Once ignited, the self-propagating combustion wave front produces high temperatures suitable for brazing the components together.

The components are contained and processed in a microwave brazing chamber. A microwave generating source supplies microwave energy to the chamber. The components are oriented to result in efficient exposure to the electric field in the chamber. The position and orientation of the components in the chamber can also be used to enhance the selective heating of one component over the others.

In one embodiment, a non-contact temperature measurement device measures the temperature of one component, preferably the strongest microwave absorbing component, and sends information in a temperature feedback control loop to the microwave generating source. Another embodiment features two non-contact temperature measurement devices. One device measures the strongest microwave absorbing component; the other device measures the weakest microwave absorbing component. The two temperature measurement devices allow assessment of the temperature difference between the brazing components.

DESCRIPTION OF THE PREFERRED EMBODIMENTS

Microwave Brazing Facility

Figure 1:
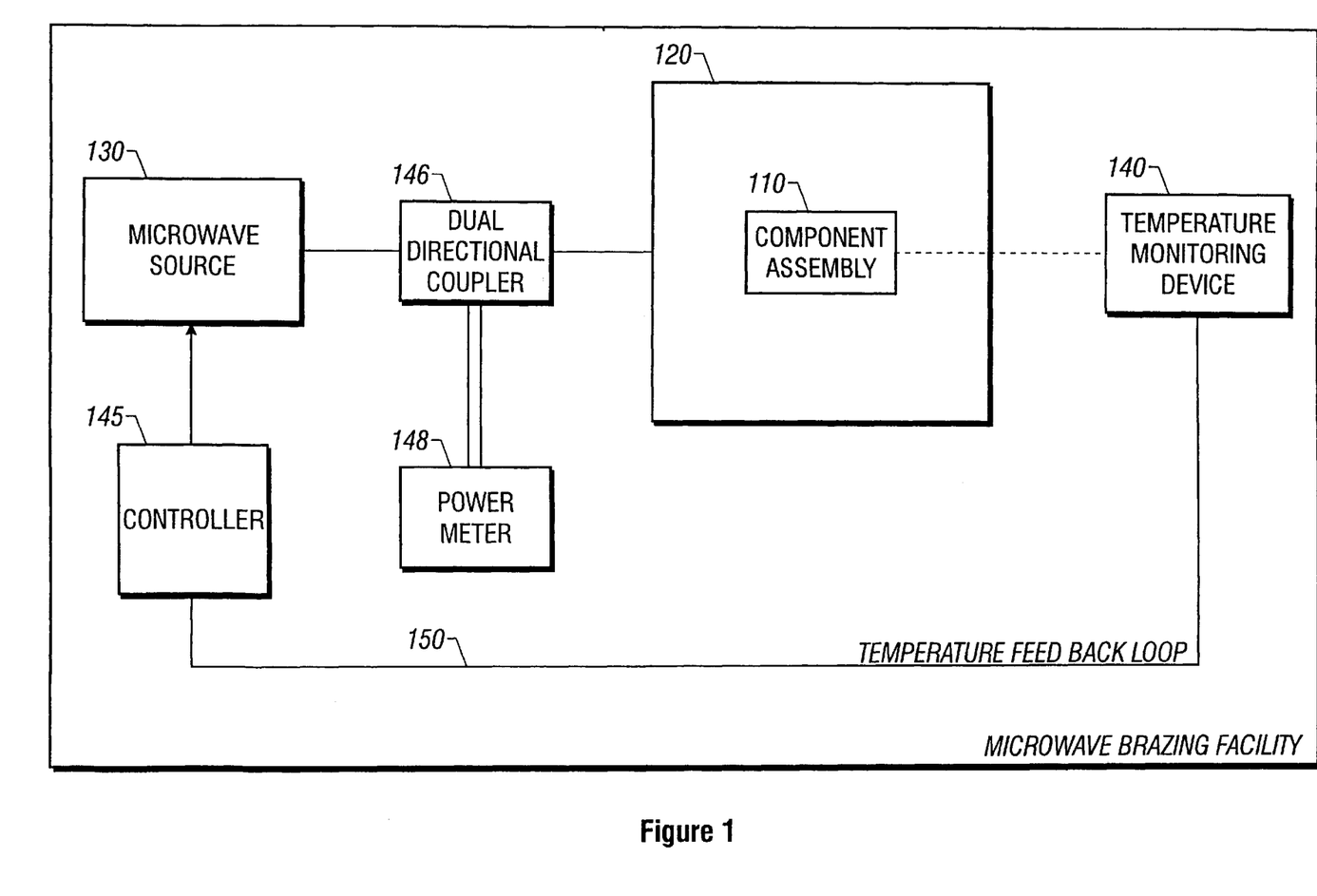
FIG. 1 is a block diagram of a microwave brazing facility.

FIG. 1 is a block diagram of a microwave brazing facility. In this embodiment, a component assembly 110 is placed in a microwave processing chamber 120. A microwave source 130 supplies microwave energy to the processing chamber 120 thereby heating the component assembly 110. A temperature monitoring device 140 measures the temperature of the component assembly 110 and is coupled to the microwave source 130 forming a temperature control feedback loop 150.

Temperature monitoring device 140 is preferably a unit that enables sensing temperature of isolated areas on the monitored device. The temperature monitoring device 140 is used in accordance with a controller 145 to control the output power of the microwave source to adjust the temperature gradient of the component assembly 110. A dual directional coupler 146 and power meter 148 are used to measure the forward and reflected power near the entrance to the processing chamber cavity 120.

Cutter Assembly Components

Figure 2:
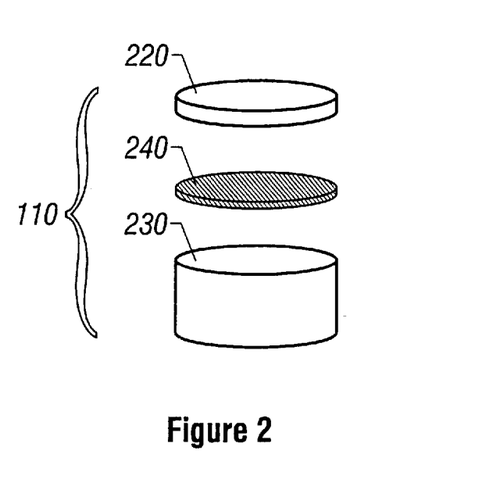
FIG. 2 shows more detail of a cutter assembly.

FIG. 2 shows more detail of one embodiment of component assembly 110. When joined by brazing, the component assembly 110 forms a cutter assembly that can be attached to a drill bit head. The component assembly 110 has a thin diamond component 220 stacked coaxially on top of a tungsten carbide (WC) component 230 with an adhesion layer—a braze interlayer 240—sandwiched between them.

Preferably, each of these three components in the stack is cylindrically shaped with about the same diameter, around 13.5 mm. The diamond component is about 1.0 to 4.0 mm in height. The tungsten carbide component is about 3 to 8 mm in height. The interlayer is 0.08 to 0.8 mm and is thinner than either of the other component layers.

The diamond component is made of thermally stable polycrystalline (TSP) diamond. These commercial grade diamond disks will turn to graphite and loose their wear-resistance if they are heated to greater than a temperature of 1200° C.

The diamond component is brazed to a support component. The support component is made of a refractory hard metal, or a metal such as molybdenum, or a composite of a refractory hard metal and a metal. Refractory hard metal includes a class of materials such as carbides, borides, and silicides that are high temperature materials. These materials have a hardness of 9 or greater on the MOH scale of hardness and melt at temperatures over 1000° C. In the preferred embodiment, the diamond component is brazed to a composite of a metal and a refractory hard metal, namely, 6 to 20% cobalt bonded fine grain tungsten carbide substrates. Other refractory hard metals and metal composites can also be used.

The interlayer, when melted, needs to adequately wet both the diamond component and the support component. The support component is preferably made of carbides as discussed previously. Carbides can be easily wetted by metal and alloys such as nickel, copper, silver, and gold. However, the diamond component is not adequately wetted by these metals. In other words, these metals do not have a high affinity for diamond surfaces.

Reactive braze alloys, in contrast, can be used to adequately wet diamond surfaces. A type of reactive braze alloy, called carbide formers, changes the surface of the diamond so that it can be wetted. Carbide formers include molybdenum, tungsten, titanium, tantalum, vanadium, and zirconium. In the preferred embodiment, the braze filler metal composition is 4.5 Ti-26.7 Cu-68.8 Ag. Titanium is the preferred reactive element that wets the surface of the diamond. Copper, nickel, silver, and gold alloys can easily wet the carbide support component.

The interlayer material is fabricated to have uneven, raised areas that create microscopic peaks and valleys on the interlayer disk. The raised areas need to be only a few thousands of an inch to significantly modify heat transfer. This uneven topography allows localized melting of the interlayer by reducing heat transfer to other components until a part of the interlayer has melted.

The melted interlayer melts and diffuses into the adjacent diamond and tungsten carbide support substrate at high temperatures forming a braze joint. The melted interlayer migrates to adequately wet the two adjacent components by capillary action. A good capillary action and greatest shear strength are achieved with brazing joint fillets which range from 0.08 to 0.8 mm (0.003–0.030 inch). Braze thickness of less than 0.020 mm (0.001 inch) is considered detrimental due to the different thermal expansion such as between diamond and tungsten carbide.

Another embodiment forms the interlayers of functionally-graded materials that are combustible. Functionally-graded materials can be constructed to have added affinity to the diamond component on one side and more affinity to the tungsten carbide substrate on the side in contact with the tungsten carbide. These non-homogenous affinity materials better wet the two different adjacent substrates and improves joint strength.

The affinity, for example, allows one end of the material to wet the diamond and hence form a better joint. For example, titanium helps wet the diamond joint. The other end can have affinity for tungsten carbide, which is easier to wet.

Interlayers made of combustion synthesis compounds can be ignited by microwaves leading to a combustion wave front resulting in temperatures of several thousand degrees. These high temperatures facilitate interlayer phase change to improve the brazing process.

The stack of diamond component, interlayer, and tungsten carbide support component is placed in a sample holder, preferably, a cylindrical quartz tube, to maintain approximate alignment of the component layers during the brazing process. One embodiment features a support of at least three quartz fingers to maintain alignment. In early experiments, the components in the stack were of differing diameters. Weak vibrations transmitted through the laboratory floor were able to disrupt the alignment during processing. Hence, custom fitted quartz tubes that match the diameter of the components were later used to improve alignment during processing. These quartz tubes are preferably 0.5–2 mm larger than the outer diameter of the components. Preferably, the quartz tubes also allow a gap between the tube and the components near the braze line to be wide enough to insure that capillary action does not cause an extraction of excessive amount of molten material out of the joint during processing.

Microwave Source and Process Chamber Conditions

It is desirable to orient the component assembly to a position of high electric field intensity within the microwave processing chamber. The conditions within the process chamber should facilitate the components' absorption of the microwave energy. Such desired positions are related to the type of microwave source and the resonant mode generated by the source.

Figure 3:
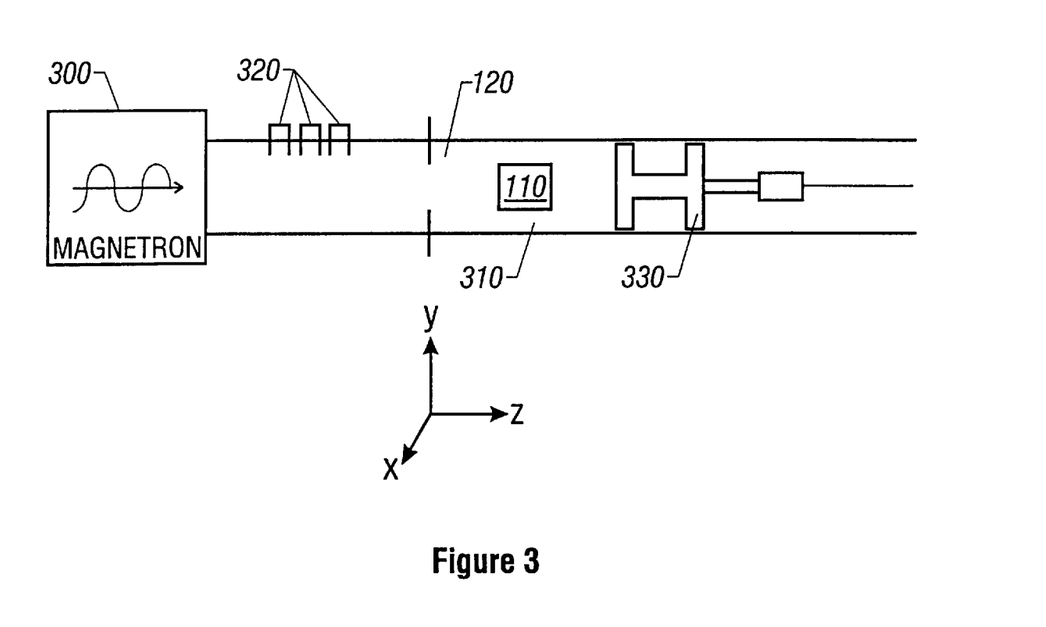
FIG. 3 shows one embodiment using a magnetron power source.

FIG. 3 shows one embodiment using a 1 kilowatt magnetron power source 300. A rectangular waveguide cavity 310 forms the process chamber 120. The cavity is excited in the TE102 resonant mode that has electric field maxima along the lines defined by $z/Lz=¼$ and $¾$ and $x/Lx=½$. A three stub tuner 320 is located near the entrance to the cavity for impedance matching. One of the stubs is specially instrumented for automatic control with the aid of a feedback circuit that senses the reflected power. A movable plunger 330 under automatic control is provided for maintaining the resonant frequency of the partially filled cavity at 2.45 GHz, the operating frequency of the magnetron. The size of the cavity 310 is determined by the movable plunger 330. The component assembly 110 is located near an electric field antinode with its axis in the y-direction, parallel to the electric field direction.

The process chamber 120 in FIG. 3 is filled with a flowing argon atmosphere. Glow discharge and plasma formation in the argon atmosphere around the component assembly 110 leads to substantial variations in the microwave power transmitted into the cavity. In turn, this causes irregular heating of the component assembly.

When the plasma forms, the impedance of the cavity increases so much that repeated manual adjustment of the three stub tuner 320 is necessary in order to bring the instrumented stub back into its range of effectiveness. As a consequence, the input power to the cavity 310 fluctuates violently during the operation. Although the sample braze joints produced under these conditions appears to be satisfactory according to visual inspection, reproducible results are difficult to achieve in the presence of a gaseous atmosphere and the plasma that it engenders in the high electric fields inside the cavity.

Brazing under vacuum can reduce plasma interference. In one embodiment, the quartz tube support is evacuated through a pumping line attached to its open end. The vacuum system includes a pump that can maintain pressures below $10^{-4}$ Torr for long periods of time. Pumps capable of maintaining lower pressures can also be used. It is also possible to evacuate the entire process chamber. Evacuating the quartz tube is preferred because it is more cost effective to evacuate a smaller volume. Brazing under vacuum suppresses glow discharge and plasma formation except for occasional glow discharge at the beginning of pumpdown. These occasional events are probably due to outgassing as the sample temperature begins to rise.

Any turbopump capable of achieving pressure levels around $10^{-5}$ Torr or lower can be used, such as the pumps available from Torr Vacuum Products. This can shorten the time required to produce a diamond braze joint and reduces any remaining problems due to glow discharge.

Figure 4:
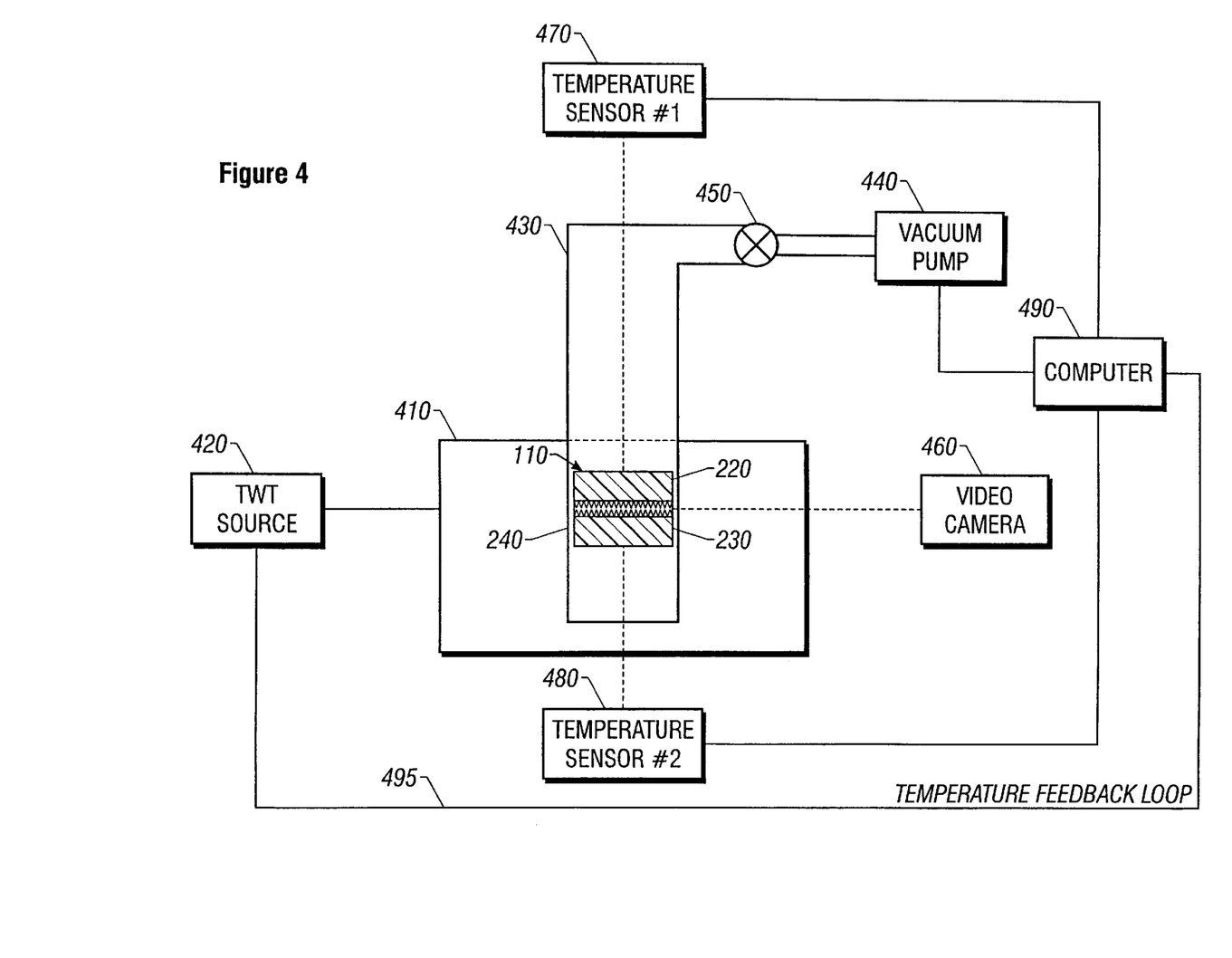
FIG. 4 is a block diagram of one embodiment using a Traveling Wave Tube (TWT) power source.

FIG. 4 shows another embodiment of the present invention featuring a cylindrical cavity 410 excited in a TM0010 mode and driven by a traveling wave tube (TWT) amplifier 420 near 2.45 GHz. The TWT is a variable frequency source and therefore provides a simple means for compensating for the shift in resonant frequency associated with insertion and heating of the component assembly 110 or sample in the cavity. The TWT amplifier used is capable of delivering over 300 Watts near 2.45 GHz frequency.

The component assembly 110 is contained in an evacuated quartz tube 430 that extended through the curved wall of the cavity 410. The quartz tube is evacuated by a vacuum pump 440. The vacuum atmosphere within the quartz tube 430 is regulated by a valve 450. In one embodiment, the component assembly 110 has a diamond component 220, an interlayer 240, and support tungsten carbide component 230 forming a cutter assembly when brazed. The diamond is positioned near the center of the cavity with its flat face parallel to the cavity's axis. The assembly stack inside the quartz tube is positioned vertically in a cylindrical cavity whose axis is horizontal. The center of the diamond disk is near a midplane of the cavity, where the electric field strength is maximum for the TM010 mode in which the cavity is excited.

Attempts at brazing with the cylindrical sample aligned coaxially with the cavity were not successful in achieving brazing temperatures. Theory suggested that this failure is due to an unfavorable orientation of the electric field relative to the flat face of the diamond, the two being mutually perpendicular in this configuration. Theory further suggested that this situation can be remedied by orienting the stack so that its axis is perpendicular to the cavity axis, in which case the flat face of the diamond is parallel to the electric field, and the coupling of the microwave field to the diamond is substantially improved. This configuration produces brazing temperatures in the component assembly stack. This specific orientation is crucial for efficient heating of the component assembly stack. Successful braze joints have been achieved using only 100 Watts from the TWT microwave power source.

The Process and Control

The temperature of the braze interlayer material will depend on the energy absorbed and the conduction (and radiation) occurring between the different components as they are being heated. Microwave energy will preferably heat the good microwave absorbing materials. The short penetration depth of electromagnetic waves into a metal component tends to limit its absorption of microwave power. A non-metallic material's ability to absorb microwaves depends primarily on the imaginary part of the dielectric constant. A larger imaginary part of the dielectric constant indicates that the material is a better absorber of microwave energy. In general, the imaginary part of the dielectric constant increases with increasing temperature. The result is that most materials become reasonably good absorbers of microwave energy at higher temperatures.

In one embodiment forming a TSP diamond drill bit cutter assembly, the inventors' previously intended to control the brazing process by selectively heating the interlayer first, then the tungsten carbide component, and finally the diamond component. TSP diamond was thought to be a poor microwave absorber. One of the surprising findings during development of the present microwave-assisted diamond brazing process is that the commercially available TSP diamond heated much faster than the tungsten carbide and the metal interlayer during actual practice.

In a typical brazing operation, the input power to the cavity is somewhere between 100 and 300 Watts. After about 1.5 minutes of heating, the temperature of the diamond reaches about 640° C. and the diamond starts to dimly glow red, while the tungsten carbide component and the interlayer remains dark. This means that the diamond is at a higher temperature than the other two components, and, hence, there is a temperature difference between the diamond and the other components.

The temperature of the diamond then climbs steadily to about 840° C. during the next minute and the light emitted from it grows brighter, while changing to orange, then yellow, then white. The tungsten carbide and the interlayer remains dark during this period.

The diamond then suddenly turns dark and its temperature drops to around 550° C. usually in less than a one minute time interval. The explanation for this unexpected behavior is found through diagnostic tests which reveals that a small patch of metal near the center of the interlayer melts and then provides a high thermal conductance path between diamond and tungsten carbide shortly before the diamond grows dim. This good thermal contact allows the hot diamond to cool by sharing its heat with the relatively cool tungsten carbide component, which has a high heat capacity. The temperature of the tungsten carbide is raised enough in this process for it to become a better absorber of microwaves. The temperature of the entire stack then climbs steadily with the diamond leading the way. This is inferred from observation of the intensity and color of light emitted by these components of the stack as they are heated by microwaves. The diamond starts to dimly glow red again after about an additional minute of heating subsequent to its first dramatic dip in temperature. The intensity of the radiation increases and the color of the entire stack changes from red to orange to yellow to white during about the next 2.5 minutes. When the temperature of the diamond again reaches about 730° C., and the color of the entire stack becomes yellow, a black line then starts to form on the wall of the quartz tube opposite the metal interlayer. Diagnostic tests reveals that this line consisted of metal evaporated from the interlayer and subsequently deposited on the quartz tube. After its initiation, the black line spreads across the entire sample at the level of the braze, indicating that the outer edge of the interlayer has melted at least all the way across the half of the component assembly that is in view. The time required for this growth of the line is variable, but is usually somewhere between 0.5 and 6.0 minutes. The microwave power can be either held constant or gradually reduced over the next two minutes after the molten interlayer region spans the sample. Then the microwave power is turned off and the sample allowed to cool. This completed the diamond brazing process. A number of different heating scenarios with varying processing rates and duration have been investigated. Heating times that range from about 4 minutes to about 23 minutes have been investigated. Other heating times are possible.

Process control is achieved through several monitoring embodiments as shown in FIG. 4. The component assembly stack 110 is viewed through a port in the curved cavity wall with the aid of a video camera 460. The video images are observed on a monitor during processing and are recorded for reference. The video images aid in analyzing and controlling the diamond brazing process.

Temperature monitoring is done to control the brazing process. The actual temperature of the components when brazing takes place will depend on the microwave power absorbed, thermal conduction, and radiation associated with each component. A non-contact Accufiber(TM) remote sensing device 470, available from Luxtron Corporation, Santa Clara, Calif. can be used as a temperature monitoring device. An Accufiber sensor is a total radiation pyrometer. The sensor is used to measure the temperature of one of the brazing components in the component assembly. Preferably, the strongest microwave absorbing component is measured, namely, the TSP diamond component 220. All temperature data are values indicated by the Accufiber, which is not calibrated for absolute temperature measurement. The Accufiber sensors can be easily calibrated so that absolute temperature is measured instead of "effective" temperature.

A second temperature monitoring device 480 can be installed to measure the temperature of the tungsten carbide. Two temperature measurement devices allow assessment of the temperature difference between the brazing components. This enables more complete characterization and control of the brazing operation.

The non-contact temperature measuring devices used to monitor the component assembly temperature during processing are coupled to a computer 490 in a feedback loop 495 to control the input microwave power.

A computer program, created in LabVIEW(™) software, available from National Laboratories, Austin, Tex., is used to apply a prescribed temperature versus time schedule for heating the sample stack. The program can be used to record and analyze the temperatures recorded by the temperature measuring device. The program then adjusts the input microwave power accordingly.

As discussed above, this heating procedure provides an indicator of when the interlayer has partially melted. That moment is indicated by an abrupt drop in the temperature of the diamond. A black line extending across the quartz tube enclosure at the level of the metal interlayer indicates that sufficient vapor pressure has occurred to cause the interlayer material to deposit on the cooler quartz tube. The appearance of this black line indicates complete melting of the interlayer. This indicator allows greater control of the brazing process.

Figure 5:
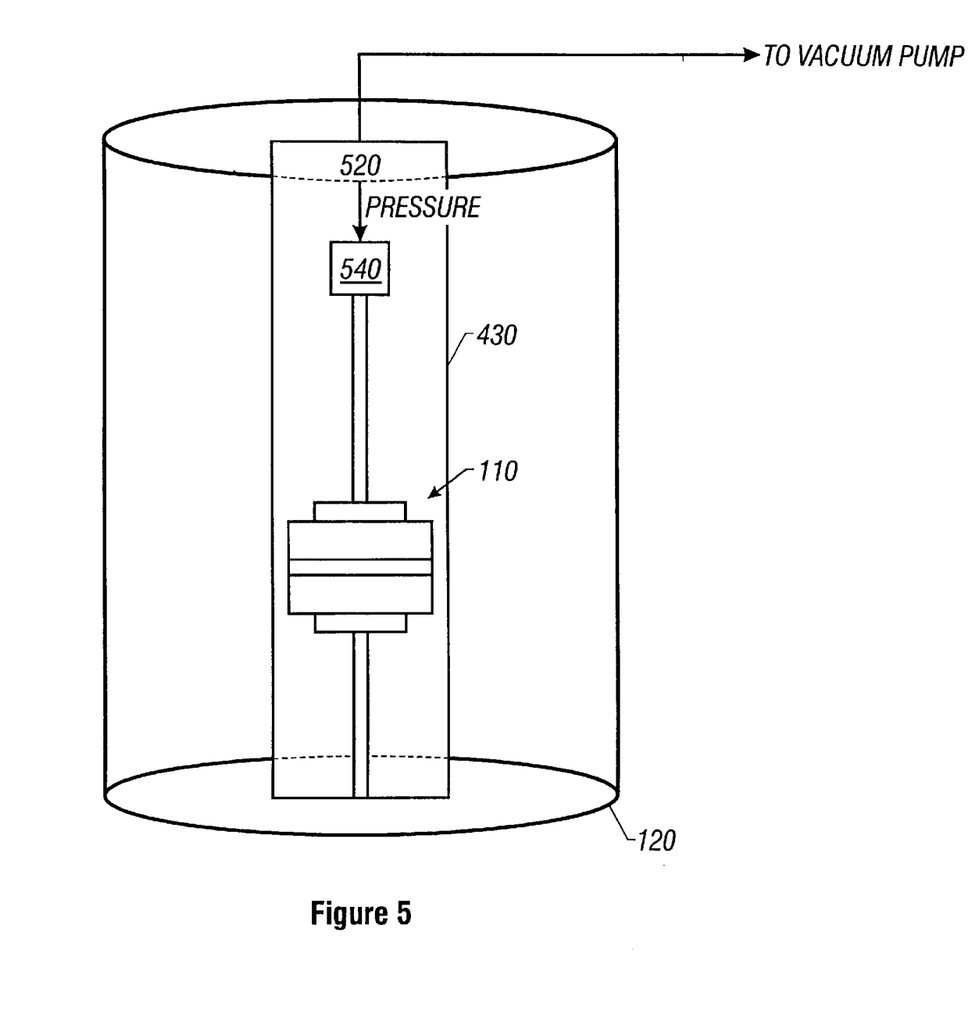
FIG. 5 shows an embodiment using pressure as an indicator for melting.

FIG. 5 illustrates another embodiment using pressure to provide an additional indicator of the point when the interlayer melts. A constant pressure from a pressure source 520 is applied to the brazing component assembly 110 during heating. A strain gauge 540 is coupled to the component assembly 110. The pressure source 520, strain gauge 540, and component assembly 110 are placed in an evacuated environment, preferably in an evacuated quartz tube 430 positioned in the process chamber 120. After the interlayer has started melting, the interlayer softens. The softening of the interlayer will cause a reduction in the separation between components. This reduction in separation leads to a reduction in the pressure as measured by a strain gauge 540 thereby providing an indicator of melting.

Microwave brazing of a variety of similar and dissimilar materials is possible using the methods described above. Three-component brazing of TSP diamond to tungsten carbide is one embodiment. Multiple component brazing is also possible.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A microwave heating method, comprising:
   aligning an adhesion layer between a first component and a second component;
   selectively microwave heating one of the first component or the second component to a higher temperature than the adhesion layer to melt the adhesion layer while a temperature difference exists across the adhesion layer between the first component and the second component.

2. A method as in claim 1 further comprising cooling the adhesion layer after said selectively heating.

3. A method as in claim 2 wherein said cooling the adhesion layer after said selective heating produces a braze joint.

4. A method as in claim 3 further comprising monitoring and adjusting said temperature difference across said braze joint via a feedback loop to reduce stresses in the braze joint resulting in a stronger braze joint.

5. A method as in claim 1 wherein said selectively heating comprises selectively heating until the adhesion layer melts sufficiently to wet the first component.

6. A method as in claim 5 wherein said first component is a diamond component.

7. A method as in claim 1 wherein the second component is a support component formed of a material including a refractory hard metal.

8. A method as in claim 7 wherein said refractory hard metal is a carbide.

9. A method as in claim 7 wherein said support component is formed from a material including a refractory hard metal, or a metal, or a composite of a refractory hard metal and a metal.

10. A method as in claim 9 wherein said metal is molybdenum.

11. A method as in claim 7 wherein the support component is formed from a material including cobalt and a refractory hard metal.

12. A method as in claim 1 wherein the first component is a support component formed of a refractory hard metal.

13. A method as in claim 1 wherein the adhesion layer is formed from a material including a reactive braze alloy.

14. A method as in claim 13 wherein the reactive braze alloy is a carbide former.

15. A method as in claim 14 wherein the carbide former is titanium.

16. A method as in claim 1 wherein the adhesion layer is made of titanium, copper, and silver.

17. A microwave processing method, comprising:
    positioning a diamond component, an interlayer, and a support component such that the interlayer is between the diamond component and the support component;
    selectively heating the interlayer and melting the interlayer, such that the interlayer wets and diffuses into the diamond component and the support component;
    cooling the interlayer to form a braze joint between the diamond component and the support component.

18. A method as in claim 17 wherein the support component is a material containing a refractory hard metal.

19. A method as in claim 17 wherein said heating comprises a selective heating process which heats one of said support component and said diamond component more than it heats said interlayer.

20. A method as in claim 19 further comprising monitoring a temperature of said one component.

21. A method as in claim 19 further comprising monitoring a temperature of said support component.

22. A method as in claim 17 wherein said positioning comprises obtaining an interlayer which has functionally-graded characteristics which varies from one end to another.

23. A method as in claim 22 wherein said functionally graded characteristic has an affinity for diamond at one end and an affinity for a material of said support component at the other end.

24. A method as in claim 23 wherein said affinity comprises a characteristic which helps the material wet the component.

25. A method as in claim 17 wherein said interlayer has raised edges that reduce the thermal heat transfer between the interlayer and the diamond/support components.

26. A method of joining a first material to a second material comprising:
    obtaining a first component, an interlayer, and a second component, wherein the interlayer is positioned between the first component and the second component forming a component assembly;
    placing the component assembly in an evacuated environment inside a processing chamber;
    placing a microwave source such that the microwave source produces electric field intensity inside the processing chamber;
    positioning and orienting the component assembly in the precessing chamber to enhance a selective heating of one of the first component or the second component to a higher temperature than the other component;
    using a microwave energy to selectively heat the component assembly in such a way that the interlayer melts forming a braze joint between the second component and the first component;
    obtaining a temperature measurement of a specific portion of the component assembly;
    adjusting the microwave energy to allow gradual controlled cooling of the braze joint.

27. A method as in claim 26 wherein said microwave source is a traveling wave tube.

28. A method as in claim 27 further comprising orienting the component assembly so that the component assembly's axis is perpendicular to the cavity.

29. A method as in claim 26 wherein said first component is a thermally stable polycrystalline TSP diamond.

30. A method as in claim 26 wherein said second component is a refractory hard metal.

31. A method as in claim 30 wherein said refractory hard metal is a carbide.

32. A method as in claim 26 wherein said second component is tungsten carbide.

33. A method as in claim 26 wherein said interlayer is a reactive braze alloy.

34. A microwave heating method, comprising:
- positioning a first component, an interlayer, and a second component such that the interlayer is between the first component and the second component in a quartz tube;
- selectively heating the first component by microwave energy;
- measuring temperature of said first and second components;
- selectively heating the interlayer and melting the interlayer, such that the point when the interlayer partially melts is indicated by a drop in temperature of the first component;
- adjusting the microwave power to gradually heat and cool the first component, the interlayer, and the second component.

35. A method as in claim 34 wherein said point when the interlayer partially melts is subsequently accompanied by formation of a black line extending across the quartz tube enclosure at the level of the interlayer.

36. A method as in claim 34 wherein said quartz tube allows a gap between the tube and the components wide enough to insure that capillary action does not cause an extraction of excessive amount of molten interlayer out of the joint.

37. A method of indicating onset of melting, comprising:
- heating a multi-component assembly;
- applying a constant pressure to said assembly during heating;
- measuring a strain of the component assembly during heating;
- melting a component in the assembly;
- detecting a change in the strain of the component assembly indicative of the onset of melting.

* * * * *